US006992722B2

(12) United States Patent
Jung

(10) Patent No.: US 6,992,722 B2
(45) Date of Patent: Jan. 31, 2006

(54) CLOSED CIRCUIT TELEVISION CAMERA

(76) Inventor: Woonki Jung, 138 13745 Oak Crest Dr., Cerritos, CA (US) 90703

( * ) Notice: Subject to any disclaimer, the term of this patent is extended or adjusted under 35 U.S.C. 154(b) by 898 days.

(21) Appl. No.: 10/053,945

(22) Filed: Jan. 24, 2002

(65) Prior Publication Data

US 2003/0030748 A1    Feb. 13, 2003

(30) Foreign Application Priority Data

Aug. 7, 2001  (KR) .................. 20-2001-0023923

(51) Int. Cl.
*H04N 5/225*    (2006.01)

(52) U.S. Cl. ................... 348/373; 348/151; 396/427

(58) Field of Classification Search ........ 348/372–375, 348/143, 151; 396/927
See application file for complete search history.

(56) References Cited

U.S. PATENT DOCUMENTS 4,736,218 A  *  4/1988  Kutman ................. 348/373
5,394,209 A  *  2/1995  Stiepel et al. ........... 348/151

* cited by examiner

*Primary Examiner*—David L. Ometz
*Assistant Examiner*—Gevell Selby
(74) *Attorney, Agent, or Firm*—Marcia A. Devon

(57) ABSTRACT

An integrated Closed Circuit Television ("CCD") camera assembly is disclosed which is compact, weather resistant and tamper-proof. The camera assembly includes a housing base, a housing cover, a variable focal iris lens, a glass window, a CCD circuit board, an AC-to-DC converter circuit board, and a power input and a video output combined as a single cable. The components are attached to each other with a number of support rods which are inserted through each of the components and fastened with screws. The connection is sealed with o-rings, washers, a sponge and epoxy to protect the unit from moisture and dust. Tamper-proof screws are used to minimize the danger of human interference. A sun shield which is placed over the housing cover may also be used providing further protection from the elements.

7 Claims, 4 Drawing Sheets

CLOSED CIRCUIT TELEVISION CAMERA

BACKGROUND OF THE INVENTION

The present invention relates to Closed Circuit Television CCD (Charge-couple device) cameras. It is desirable to have a combined unit which includes a CCD camera, housing, and lens suitable for use in various security monitoring applications. It is further desirable to have a combined unit which readily permits surveillance of various areas, both indoors and outdoors, and in all types of weather conditions. Security cameras may be used to monitor stationary and moving targets and are usually mounted out of reach of persons in the vicinity, but at the same time are normally exposed to view. It is an object of the present invention to provide a camera unit which is easy to install, readily adjustable for different views, and easily maintainable while being aesthetically-pleasing and not subject to vandalism.

Problems encountered with existing security cameras, their housing and mounting designs include that they a cumbersome to install, not durable and do not provide adequate protection from the weather. Many of the present security cameras are difficult and time-consuming to assemble and install.

It is an object of the present invention to provide a new and improved of camera, housing and lens assembly which may be easily and permanently assembled installed in a desired location for surveillance. It is a further object of the present invention to readily adjustable for the desired viewing area. It is further object of the present invention to be weatherproof and vandal-resistant.

SUMMARY OF THE PRESENT INVENTION

The present invention includes: a pre-assembled Closed Circuit Television CCD (camera), a housing base formed to receive support rods, a housing cover with glass window which is joined to the base with an variable focal auto iris lens, a lens mount coupler for receiving the lens and attaching to the housing base, AC-to-DC converter (analog to digital voltage converter), mounted on a circuit board. There may also be circuit boards for the CCD components and the power circuitry. The circuit boards are joined with several support rods and fasteners, such as screws, on one end and threaded openings to receive screws on the opposite end. The lens has a key stud which is received by a slot in the coupler to prevent movement of the iris after installation. The components are protected by the complete housing with o-rings, washers, epoxy and a polyethylene sponge making a water-tight seal. The video and power cable extends from the rear of the housing base and is inserted and extended through a bushing and nut mounted inside the housing base which seals the entry point. The housing cover is also secured with tamper-proof screws. A sun shield may be included and placed on the outside of the housing base and cover to provide additional coverage of the housed camera from sun, rain and snow.

DESCRIPTION OF THE PREFERRED EMBODIMENT

Figure 1:
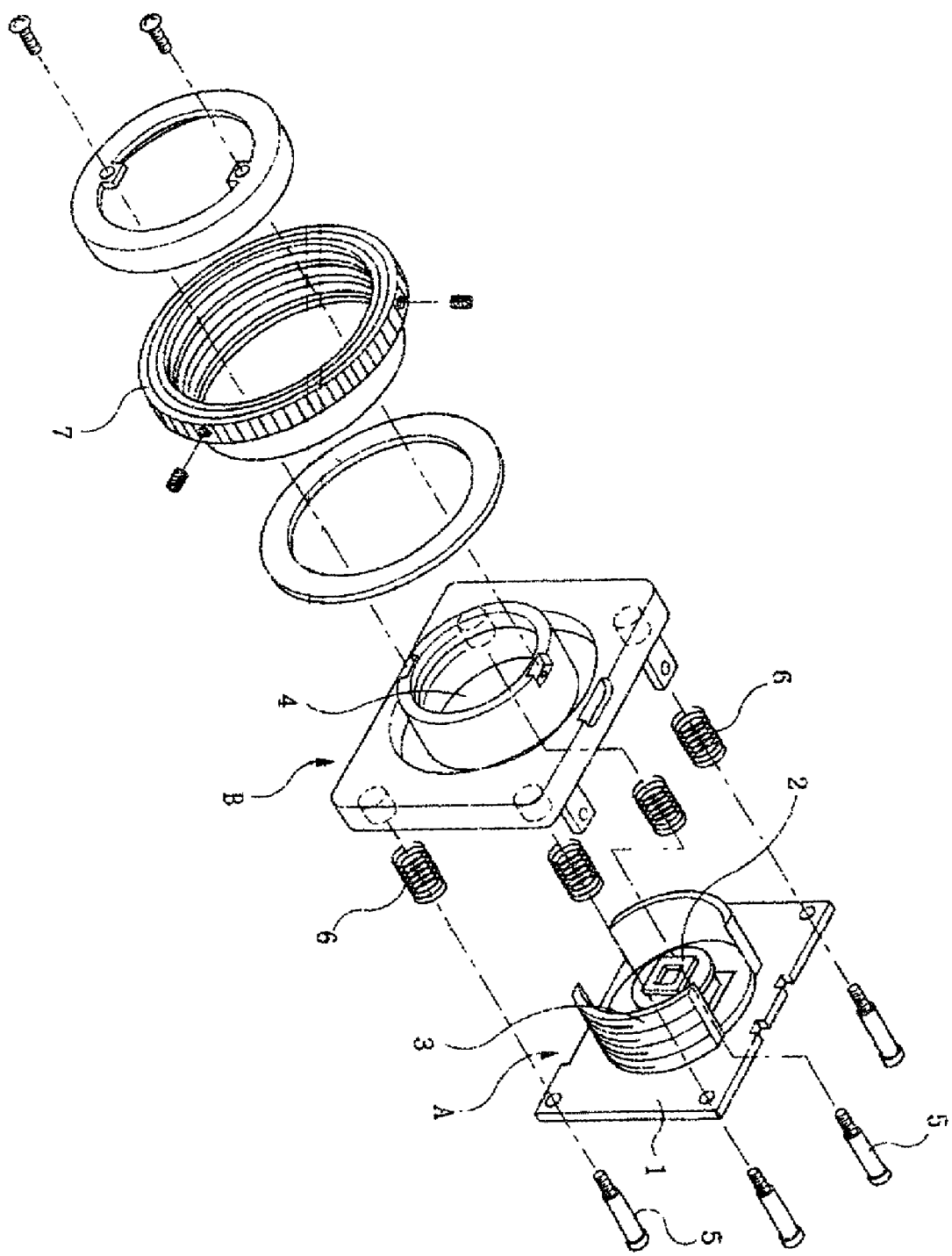
FIG. 1 is an exploded view of the present invention showing the assembly of the components.
Figure 2:
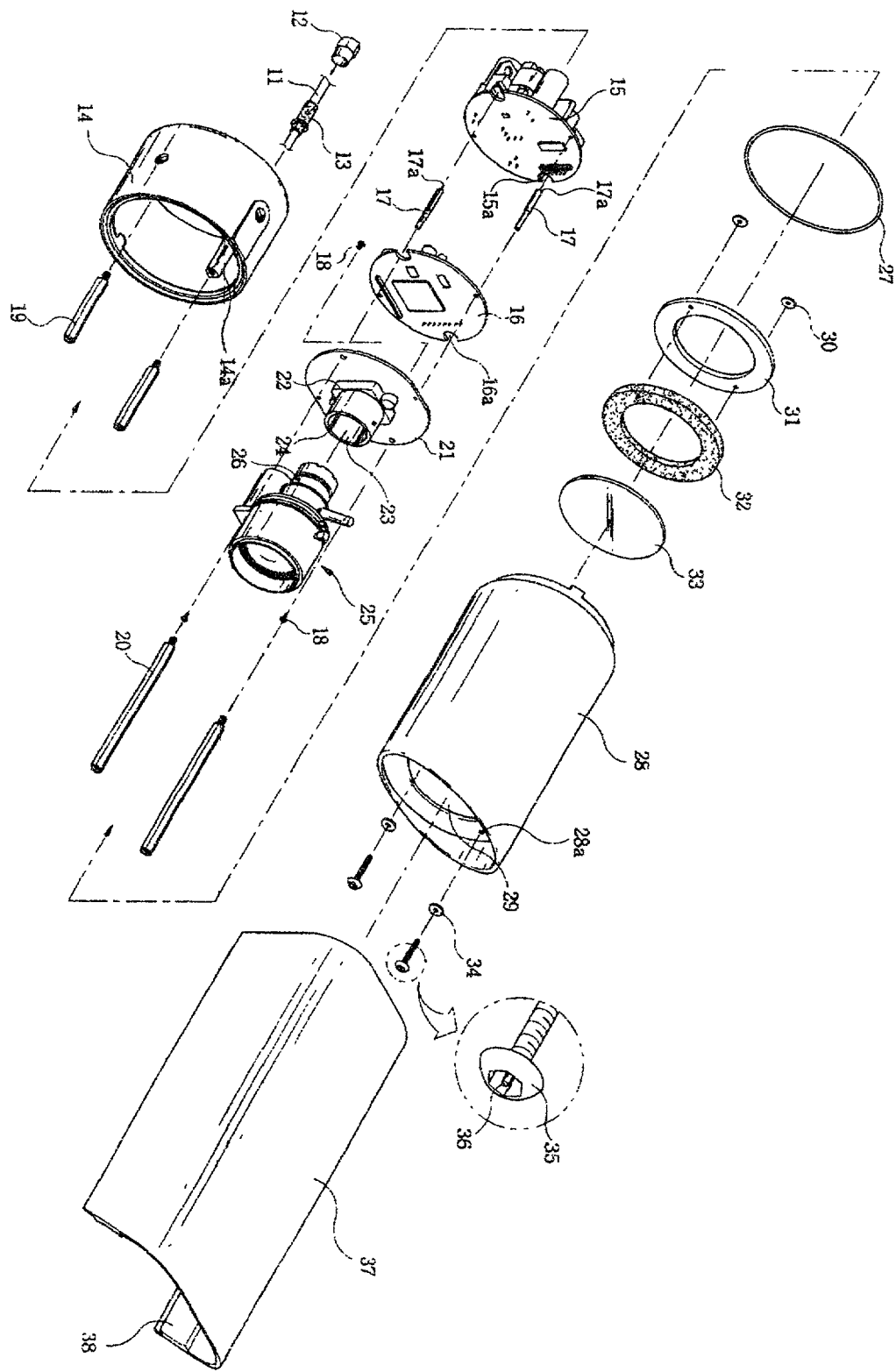
FIG. 2 is a prospective front view of the present invention.

The complete CCD camera assembly of the present invention is shown in FIG. 1 which includes: the housing base 14, the housing cover 28, the variable focal auto iris lens 25, the housing cover window 29, CCD circuit board 21, the power circuit board 16, the AC-DC converter board 15 and the power input and video output cable 11. The camera assembly is generally elongated and compact. Each of the afore-mentioned components are assembled in a layered fashion and are designed to fit within each other to minimize the size of the unit.

The housing cover 28 provides coverage of the CCD camera circuitry and lens. The housing cover 28 has a housing cover window 29 and an overhanging lip 28A to protect the glass 33 and the variable focus iris 25. The glass 33 permits the image to be viewed through the opening 29 of the housing cover 28.

The components are attached to each other using a series of support rods 17, 19, and 20 or "stand offs" which are formed in the preferred embodiment with a screw head on one end of each rod and threaded openings on the opposite end of each rod. Referring to FIG. 1, the housing base 14 is formed with bosses 14a which receives bushing 13. Bushing 13 receives the cable 11 which includes the video output signal and the voltage input signal wire/cable. The housing base 14 further receives the short support rods 19 formed with a screw head which fit into threaded openings formed in long support rods 20.

The variable focal auto iris lens 25, preferably a Vari-Focal Auto Iris D-mount lens, is placed between, but is not affixed to, the long support rods 20. The lens mount coupler 23 is formed with slot 24 to receive the key stud 26 form on lens 25. The Vari-Focal Auto Iris D-mount lens is formed with a key stud 26 to fit within slot 24 of the lens mount coupler 23.

The CCD lens holder 22 holds the lens 25 in place in front of the CCD circuit board 21. The long supports 20 (preferably hexagonally shaped) thread into the short supports through the edge of the CCD circuit board 21 and extend the distance of the lens 25 and the lens holder 22.

An o-ring seal 27 provides a water-resistance seal between the housing base 14 and the housing cover 28. The housing cover 28 has protruding alignment keys 29A that provide for proper alignment of the housing cover 28 with the housing base 14 as they are fitted into notches 10 on the housing base 14. The glass 33 is sealed using a polyethylene sponge 32 to provide a water-resistant front opening 29. The glass 33, the polyethylene sponge 32 and the disc washer 31 are held in place by epoxy and tamper-proof screws 35 that extend through these layers and are held in place by Teflon washers 30 and 34. Tamper-proof screws 35 may be TORX screws. The tamper-proof screws 35 thread into the long support rods 20 and when properly tightened, provide a water-resistance seal at the heads of the tamper-proof screws 35.

Figure 5:
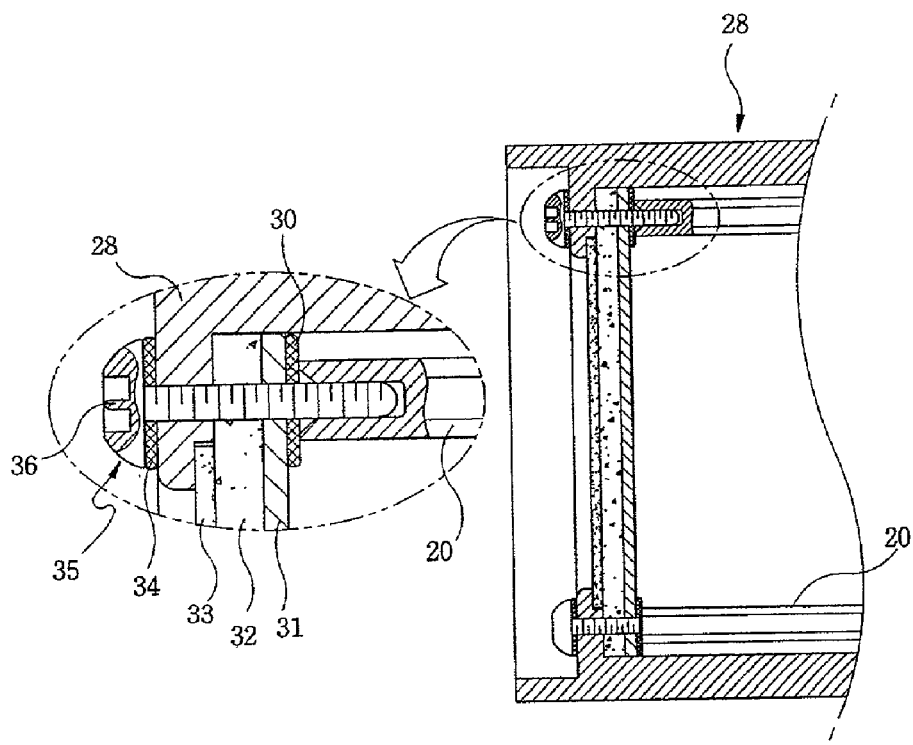
FIG. 5 is a perspective front view of the present invention shown as in its mounted position.

A standard wall mounting bracket 40 may be used to affix the integrated camera assembly to any flat surface 39 as shown in FIG. 5. The bracket is inserted into threaded mounting holes 14B (FIG. 3) which allow various mounting/viewing angles for the camera assembly.

Figure 3:
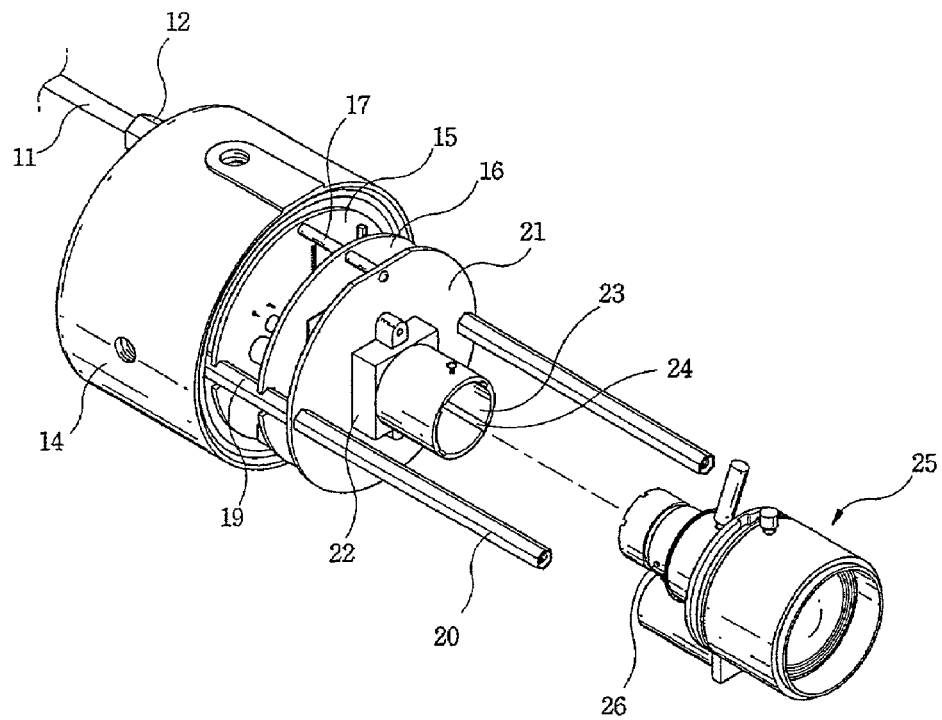
FIG. 3 is a side cross-sectional view of the present invention.
Figure 4:
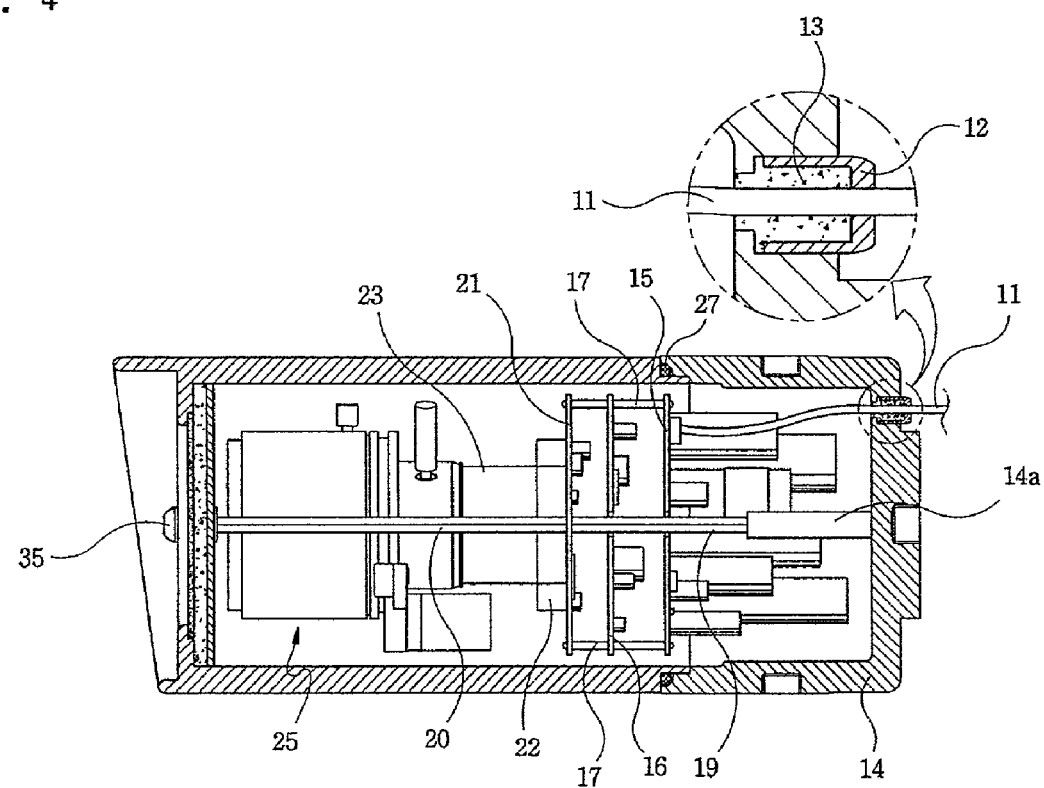
FIG. 4 is a cross-sectional side view of the housing cover taken along the line A in FIG. 5.

The power input and video output are combined in the cable 11 which is inserted in the housing base 14 and connects to power circuit board 16 inside the housing base 14 as best seen in FIG. 3. A water-resistant entry and exit point for the cable 11 is provided by inserting the cable into bushing 13 and secured by (preferably hexagonal) nut 12.

Figure 6:
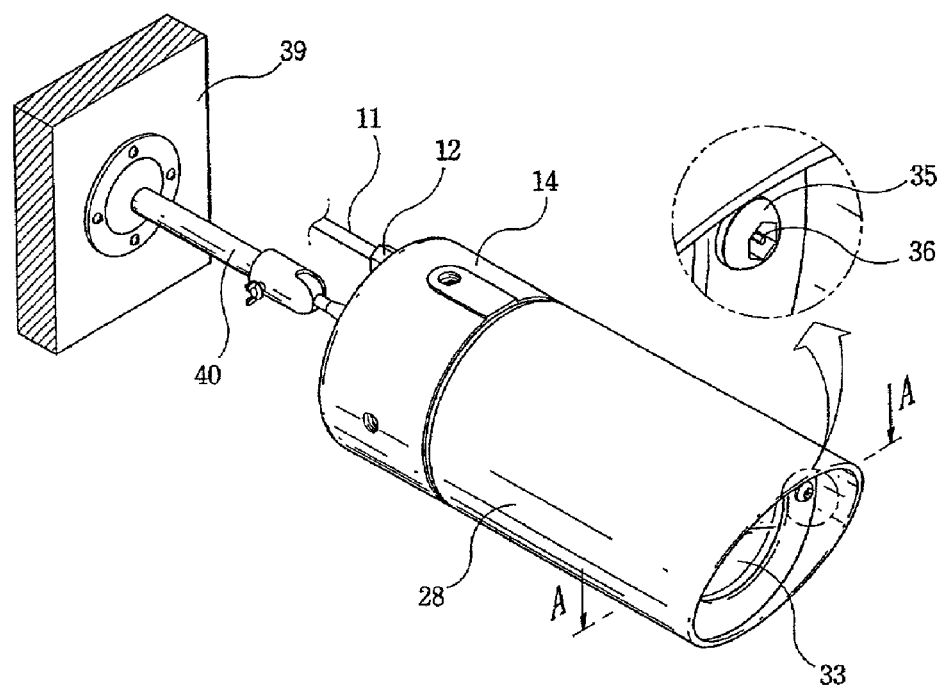
FIG. 6 is a side cross-sectional view of the present invention which excludes the AC power circuit board.

FIG. 6 shows a particularly compact embodiment of the present invention. In the embodiment shown in FIG. 6, the DC voltage is supplied directly to the camera and the AC to DC converter board is excluded. A shortened housing cover 44 is utilized to minimize the overall size of the camera assembly. With continued reference to FIG. 6, the CCD board 21 is held in place between short support rods 42 and long support rods 43. The CCD D-mount lens holder 22 enables the user to align the lens 25 and thereafter prevents further rotation by holding the Vari-Focal Auto Iris D-mount lens in place in front of the CCD circuit board 21. The CCD D-mount lens holder 22 is held in place by machine screws 18.

In another preferred embodiment, a sun shield 37 (FIG. 1) may be placed on the outside of the housing base 14 and the housing cover 28 to provide additional protection from the elements. The sun shield 37 is held in place with camera housing by self-clamping rails 38 located on the inside walls of the sun shield.

I claim:

1. An integrated camera apparatus, including a lens with front and rear ends, said apparatus comprising:
    a housing cover;
    a housing base connected to said housing cover;
    support rods which are formed with fasteners on one end and formed to receive fasteners on its opposite end, said rods removably attached to said housing base;
    an AC-to-DC converter inserted into said housing base;
    a lens assembly including an iris, said assembly having a key stud for positioning said lens between said housing cover and said housing base, said lens having openings to receive said fasteners; and
    a lens mount coupler having a slot for receiving the key stud of said lens assembly, wherein said support rods join said housing base, said AC-to DC converter, said lens assembly and said cover into an integrated unit.

2. The integreated camera apparatus of claim 1 wherein said lens iris is automatic.

3. The integrated camera apparatus of claim 1 wherein said lens iris is a D-mount type.

4. The integrated camera apparatus of claim 1 wherein o-rings and polyethylene sponges are inserted between the housing cover and said lens assembly to provide weather-tight sealing.

5. The integrated camera apparatus of claim 1 wherein the interior of said housing base is formed with a bushing mounted on the interior and a power input signal and a video output signal combined in a single cable which is inserted into the bushing on one end of the cable and exits the housing base rear wall on the opposite end of the cable.

6. An integrated camera apparatus, including a lens with front and rear ends, said apparatus comprising:
    a housing cover;
    a housing base connected to said housing cover;
    support rods which are formed with fasteners on one end and formed to receive fasteners on its opposite end, said rods removably attached to said housing base;
    a plurality of circuit boards placed within said housing cover, said circuit boards having openings along its side to receive said fasteners;
    an AC-to-DC converter mounted on a first circuit board;
    a lens assembly including an iris, said assembly mounted on a second circuit board and having a key stud for positioning said lens between said housing cover and said housing base, said lens having openings to receive said fasteners; and
    a lens mount coupler having a slot for receiving the key stud of said lens assembly, said coupler mounted on said second circuit board wherein said circuit boards have openings for receiving said fasteners such that said fasteners join said housing base, said circuit boards, said AC-to DC converter, said lens assembly, said lens mount coupler, and said housing cover into an integrated unit.

7. The appartus of claim 6 further including a power circuit mounted on a third circuit board for providing electrical power to the apparatus.

* * * * *